No. 897,397. PATENTED SEPT. 1, 1908.
J. PIRKL.
CENTRIFUGAL PUMP AND WATER WHEEL.
APPLICATION FILED OCT. 11, 1907.

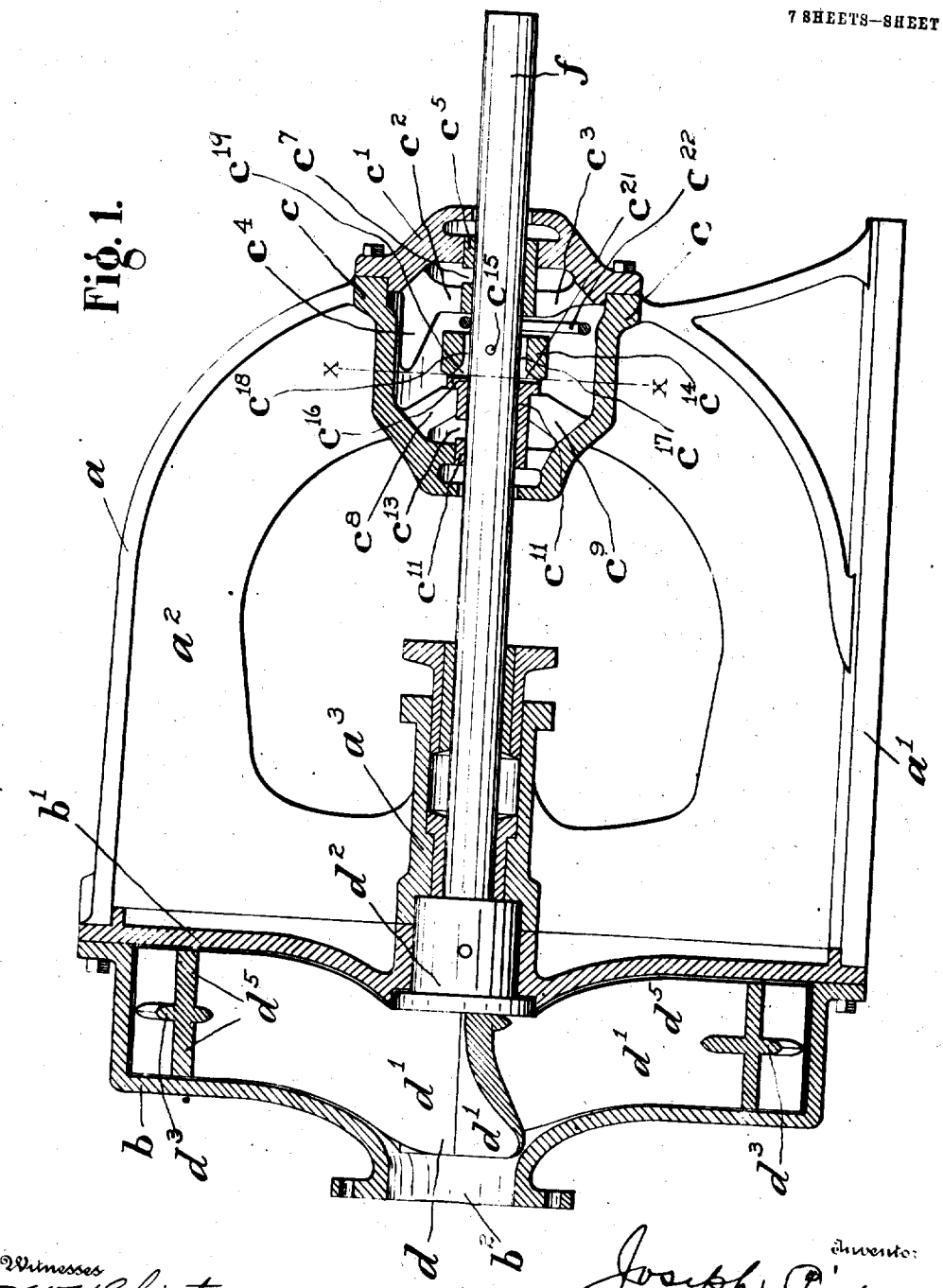

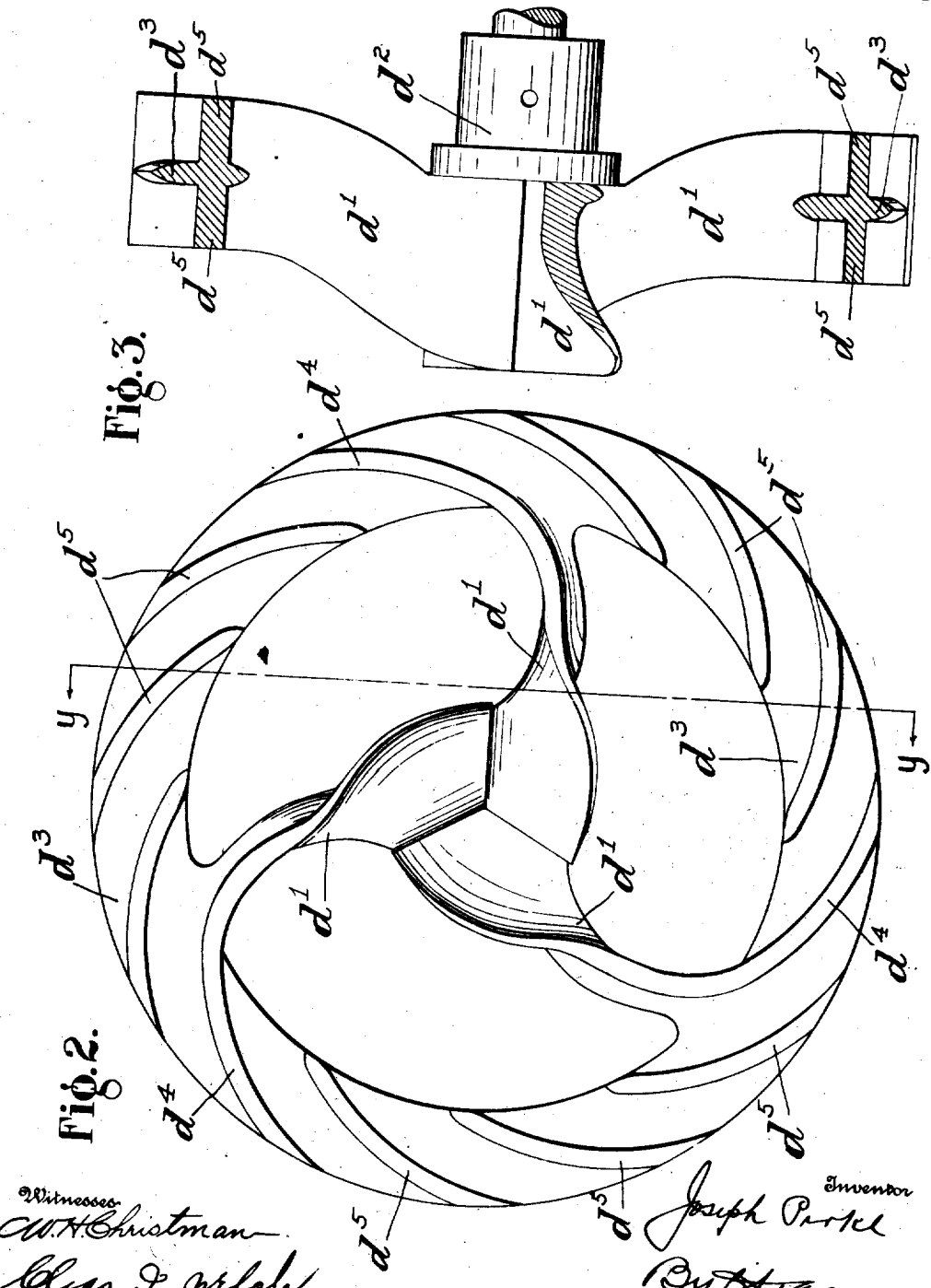

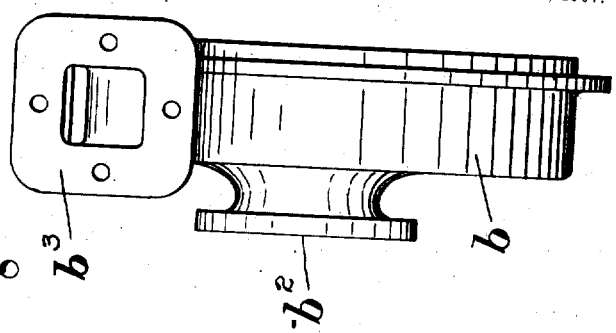
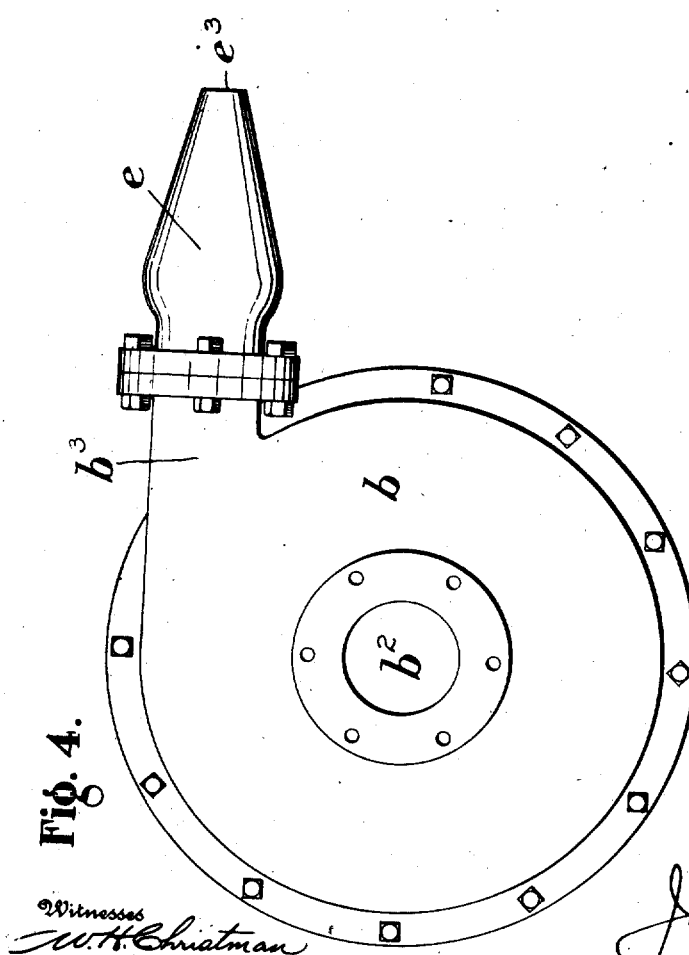
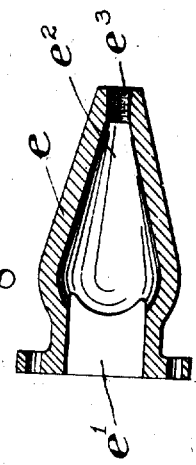
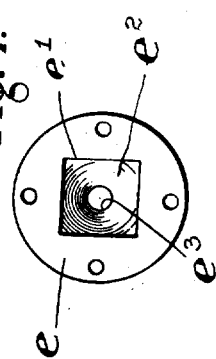

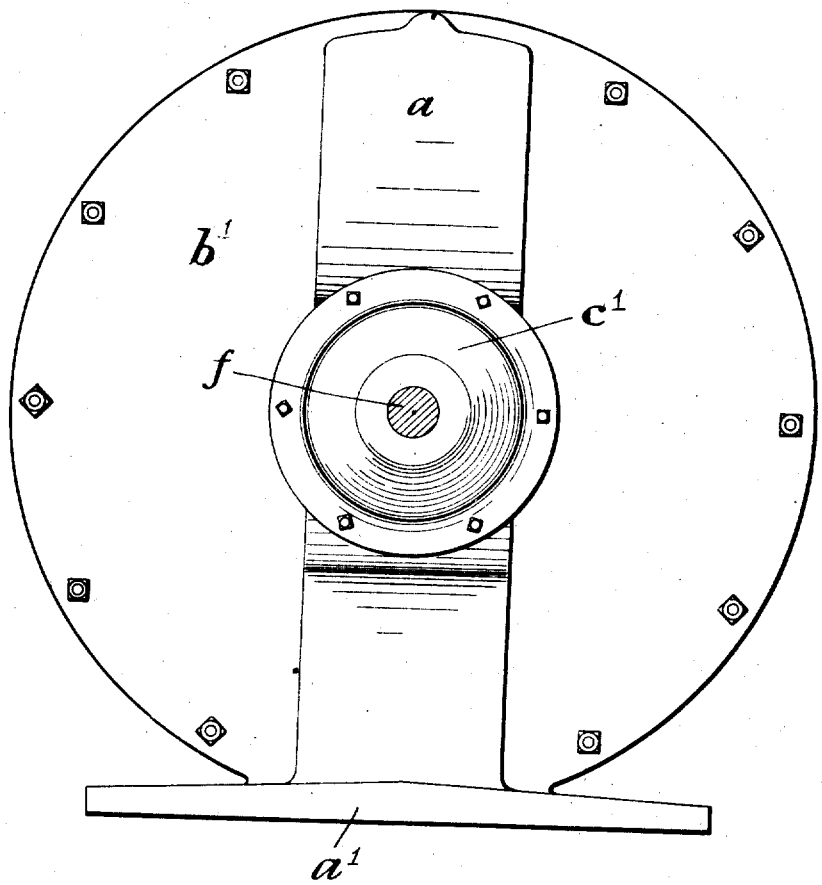

7 SHEETS—SHEET 5

No. 897,397. PATENTED SEPT. 1, 1908.
J. PIRKL.
CENTRIFUGAL PUMP AND WATER WHEEL.
APPLICATION FILED OCT. 11, 1907.

7 SHEETS—SHEET 6

No. 897,397. PATENTED SEPT. 1, 1908.
J. PIRKL.
CENTRIFUGAL PUMP AND WATER WHEEL.
APPLICATION FILED OCT. 11, 1907.

7 SHEETS—SHEET 7.

UNITED STATES PATENT OFFICE.

JOSEPH PIRKL, OF DAYTON, OHIO, ASSIGNOR TO THE DAYTON HYDRAULIC MACHINERY COMPANY, OF DAYTON, OHIO, A CORPORATION OF OHIO.

CENTRIFUGAL PUMP AND WATER-WHEEL.

No. 897,397.    Specification of Letters Patent.    Patented Sept. 1, 1908.

Application filed October 11, 1907. Serial No. 396,890.

*To all whom it may concern:*

Be it known that I, JOSEPH PIRKL, a subject of the Emperor of Austria-Hungary, and a resident of Dayton, in the county of Montgomery and State of Ohio, have invented certain new and useful Improvements in Centrifugal Pumps and Water-Wheels, of which the following is a specification.

My invention relates to improvements in centrifugal pumps and water wheels.

The first object of my invention is to provide an improved form of centrifugal pump having a rotary piston of improved construction and arranged relatively to the inlet and discharge openings so as to secure great efficiency with simple and inexpensive construction.

A further object of the invention is to improve the construction of the rotary piston or runner so as to reduce skin surface and thereby reduce the friction and avoid impact or concussion.

A further object of my invention is to provide a cut-off device for the discharge opening so that this discharge opening can be accommodated to any given quantity.

A further object of the invention is to provide an improved frame construction by which the various parts are kept in perfect alinement.

A further object is to provide improved means for lubricating the bearings and also to improve the construction of the bearings.

A further object is to provide a discharge nozzle which can be readily made to fit any size discharge pipe.

A further object is to provide a knife-shaped discharge cutter by which correct flow of water is obtained for highest efficiency.

My invention consists in the constructions and combinations of parts hereinafter described and set forth in the claims.

Figure 9:
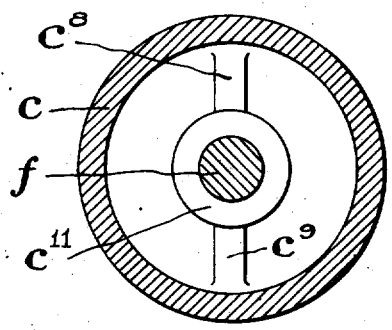
Figure 10:
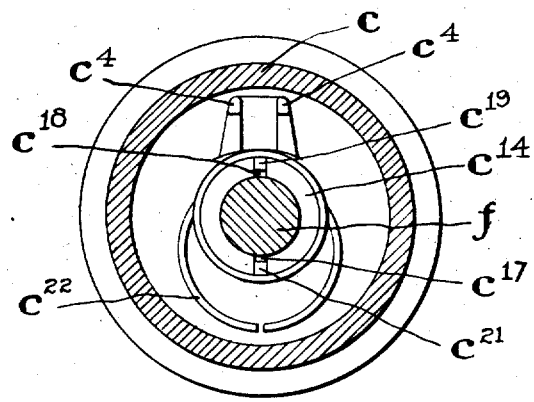
Figure 11:
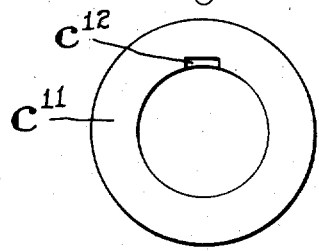
Figure 12:
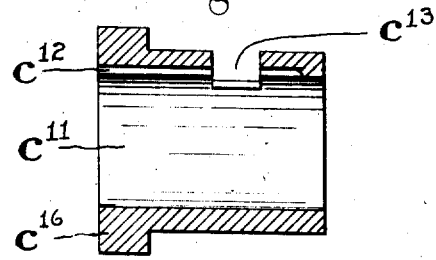
Figure 13:
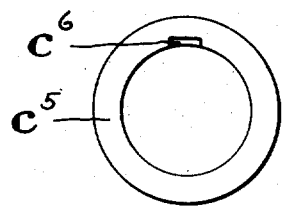
Figure 14:
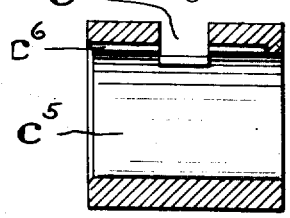
Figure 15:
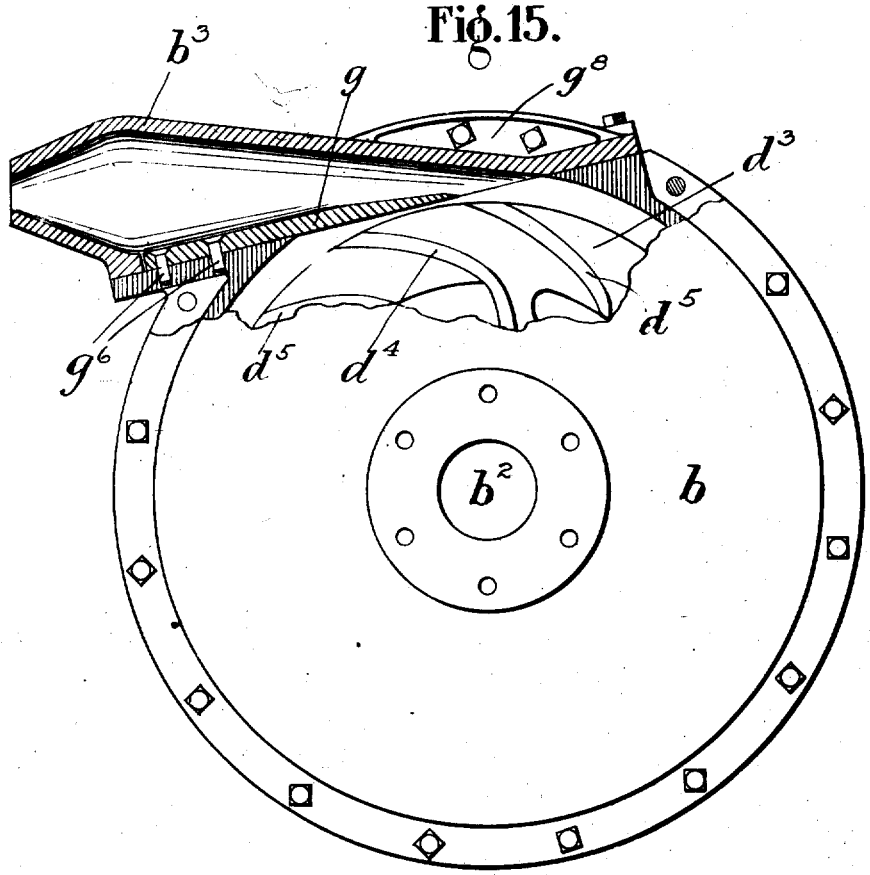
Figure 16:
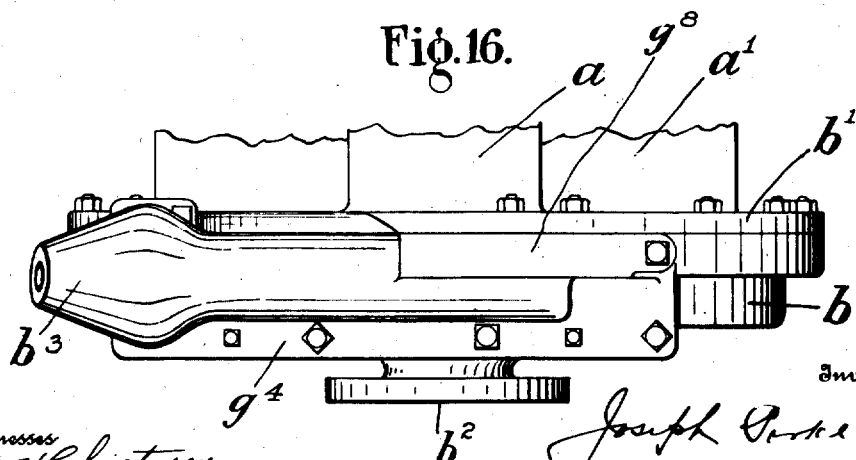
Figure 17:
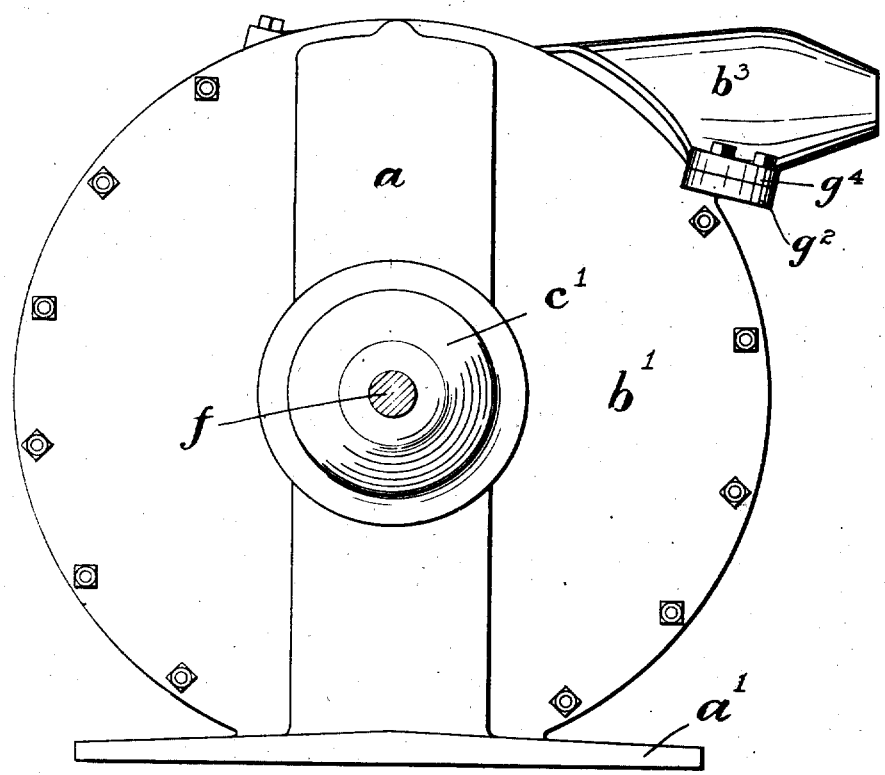
Figure 18:
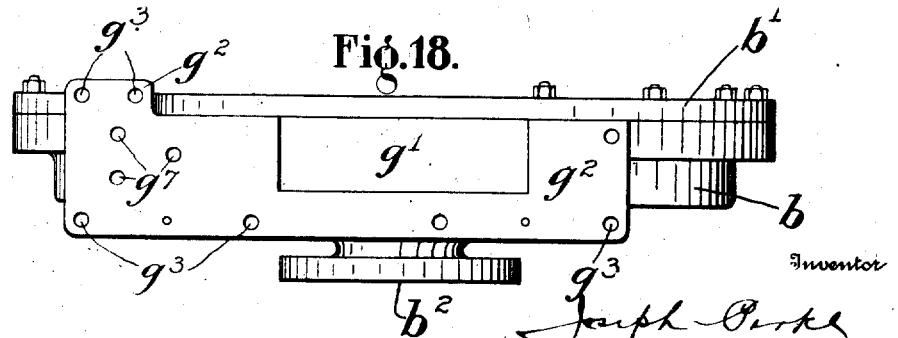

In the accompanying drawings, Figure 1 is a longitudinal sectional view of a device embodying my improvements. Fig. 2 is a side elevation of the rotary piston and Fig. 3 is a section of the same on the line $y\ y$ of Fig. 2. Fig. 4 is an end view of the cylinder showing the discharge nozzle connected to the discharge opening. Fig. 5 is a side view of the same with the discharge nozzle removed. Fig. 6 is a sectional view of the discharge nozzle. Fig. 7 is a detail of the discharge nozzle showing the shape of the inlet opening to same. Fig. 8 is an end view of the device looking toward the left of Fig. 1. Fig. 9 is a sectional view on the line $x\ x$ of Fig. 1 looking to the left. Fig. 10 is a sectional view on the line $x\ x$ of Fig. 1 looking to the right. Fig. 11 is an end view and Fig. 12 a section of one of the bushings of the bearings. Figs. 13 and 14 are similar views of the other bearing bushing. Fig. 15 is an end view of the cylinder looking towards the right of Fig. 1, the discharge housing being shown in section, and part of the cylinder being broken away to better illustrate improved cut-off. Fig. 16 is a top plan view of the cylinder showing the removable discharge housing. Fig. 17 is an end view of the cylinder looking towards the left of Fig. 1. Fig. 18 is a top plan view of the cylinder with a discharge housing or nozzle removed.

Like parts are represented by similar characters of reference in the accompanying drawings.

In said drawings, $a$ represents an arch-shaped frame mounted upon a suitable supporting base, $a^1$. This main frame carries at one end the pumping cylinder and its piston and at the other end the bearings, $c$, for the driving shaft for the piston.

The cylinder is formed of two parts in the usual way, the main casing, $b$, and the cylinder head, $b^1$, and is bolted or otherwise secured to this yoke-shaped frame. The cylinder is provided with the usual supply opening, $b^2$, to which may be bolted any suitable supply pipe, (not shown) and also with a discharge opening, $b^3$, of novel construction which will be described hereinafter.

Located within the cylinder is a rotary piston, $d$, also of novel construction. This rotary piston, $d$, has curved blades, three of which, $d^1\ d^1\ d^1$, are shown in the present instance, radiating from the hub, $d^2$, of the piston to the outer periphery of the cylinder, where they are attached to a medial, peripheral ring, $d^3$, that is, the ring is centrally located with reference to the width of the blades, $d^1$, so that said blades will project laterally on either side of said ring; being also inclined towards the periphery of said ring as indicated at $d^4$. Located on either side of this ring, $d^3$, intermediate the respective blade portions, $d^1$, are a series of equallyspaced inclined vanes, $d^5$, the inclination and shape of which correspond to the portions, $d^4$, of said blades, $d^1$, the inclination of the vanes being from the inner periphery of the ring outwardly as shown. By the construction of the piston thus described the water will be distributed so that the tendency to impact is obviated and friction greatly reduced. Also by this construction of the piston, the vanes being held together by a comparatively light medial ring, makes possible an open, light and strong construction, decreasing at the same time the amount of skin surface touched by the water and avoiding excessive end thrust toward the suction side, as is usual in other pistons.

By the construction of the piston, as described, with the curved and radial blades which connect the medial peripheral ring with the hub, having the extended screw-shaped ends which extend into and terminate in the suction opening, causes an inflow of the liquid acted upon without impact. I also preferably form the screw blades where they enter the inlet opening at an angle of substantially forty-five degrees to a plane at right-angles to the axis of rotation. I also preferably form the suction opening of such a diameter that the inlet velocity of the liquid through said suction opening equals the peripheral velocity of the revolving piston in a zone with the diameter of said suction opening. These screw-shaped blades, it will be understood, will be curved from the inclined portions to the point where they join the medial ring, at which point they will be substantially at right-angles to said ring in cross-section, as shown in Fig. 3. These curved screw-shaped blades will also be gradually tapered on the extended portion so as to permit them to terminate within the inlet opening as described, thus obviating the use of diffusion vanes and causing water to be acted upon directly by the blades at the proper angle and inlet velocity to prevent impact and therefore with minimum amount of friction.

The main frame $a$, as before stated, is mounted upon a suitable base and carries at one end the cylinder and its piston and at the other end is provided with a bearing, $c$, for the driving shaft $f$, which drives the piston. This main frame is formed arch-shaped and has a strengthening rib $a^2$. The cylinder head is secured to this frame at one end and the frame cylinder head and base form substantially one part. At the cylinder end of the frame it is provided with the usual stuffing box, $a^3$, through which the driving-shaft passes. By this construction of supporting frame and manner of mounting the operating parts thereon, the parts will be kept in perfect alinement.

The bearing, $c$, for the driving shaft, $f$, is formed with a hollow chamber which has secured to the outer end thereof a removable cap $c^1$. In this chamber the shaft runs in two brass bushings, $c^5$ $c^{11}$, as shown in Fig. 1, these respective bushings being provided with openings $c^7$ and $c^{13}$ on the top and slots $c^6$ and $c^{12}$ extending from said openings in a parallel direction with the axis of rotation. The bushings are located in the walls of the chamber and cap respectively at one end and also between the webs $c^2$ $c^3$ and $c^8$ $c^9$ respectively at the other ends. The bushings receive oil either from a rib running along the top of the hollow chamber parallel to the axis of rotation or by projections, $c^4$, extending inside the hollow chamber above the shaft, these projections being located on the cap $c^1$ and being preferably two in number. All of these means catch the oil which is thrown around from the collar, $c^{14}$, and lead it over to the respective openings, $c^7$ $c^{13}$, of the bushings. The collar, $c^{14}$, is adjacent the bushing, $c^{11}$, and secured to the shaft by a pin, $c^{15}$, so as to revolve therewith, and forming a bearing point on the face adjacent the bushing $c^{11}$, which bushing is enlarged as shown at $c^{16}$ to receive this bearing point of the thrust collar and take up the thrust thereof. The thrust collar is provided with two or more longitudinal passages $c^{17}$ $c^{18}$ and also at one end with openings, $c^{19}$ $c^{21}$, which connect the respective passage-ways, $c^{17}$ $c^{18}$, with the interior of the chamber. Loosely hung on the shaft adjacent to the thrust collar is a ring or chain, $c^{22}$, (shown in the drawings as a ring) In the operation of the bearing, the lower part of the hollow chamber will be filled with oil, which oil will be carried up by the ring or chain around to the shaft and adjacent to the passage-ways, $c^{17}$ $c^{18}$, in the thrust collar. This thrust collar, acting as a centrifugal pump will draw the oil inwardly through the passage-ways, $c^{17}$ $c^{18}$, in the thrust collar and will discharge the oil through the openings, $c^{19}$ $c^{21}$, against the inclined projections, $c^4$, or the ribs mentioned, where it will be deflected and will find its way into the bearings proper by reason of the longitudinal passage-ways and openings heretofore described in connection with the bushings, $c^5$ $c^{11}$.

In order to regulate the quantity of liquid discharged by the pump, I have provided at the point of discharge a knife-edged cutter, adapted to shear off from the revolving body of liquid inside the casing a band of liquid of a width corresponding to the quantity desired to be discharged, thus producing a correct and uniform discharge of the liquid through the discharge opening and securing the best efficiency of the pump. In order to accomplish this I have made the discharge passage or housing, $b^3$, removable and located at the point of discharge from the casing a knife-edged cutter, $g$, adapted to extend partly within the casing or cylinder.

The casing or cylinder is formed circular so that it can be easier machined, and is provided with an opening, $g^1$, at the point of its periphery where it is desired to locate the discharge. About this opening there is formed on the casing or cylinder a flange, $g^2$, to which flange the discharge housing, $b^3$, is secured, said discharge housing, $b^3$, being likewise provided with a flange, $g^4$, and the respective flanges provided with bolt holes to receive bolts to secure them together; the bolt holes of the flanges, $g^2$, being shown in Fig. 18 and indicated by the reference letter $g^5$. The knife-edge cutter, $g$, is secured to the flange, $g^2$, by screws, $g^6$, said flange being provided with openings, $g^7$, shown in Fig. 18 to receive these screws. The discharge housing, $b^3$, is provided with an upwardly extending flange, $g^8$, adapted to be bolted to the cylinder head. By this construction the shear or cutter can be easily and quickly removed so as to be replaced by another cutter different in length so that the quantity of water discharged can be regulated to meet the requirements. When this shearing knife is employed extending partly into the casing or cylinder across the discharge opening, the rotary piston will, of course, not extend to the outer wall of the cylinder as illustrated in Fig. 1 but will be reduced in diameter so as to leave an open space between its outer periphery and the wall of the casing or cylinder so as to clear the cutter as shown in Fig. 15. The discharge opening $b^3$ formed by the discharge cutter will be square in cross-section or substantially so and the end of the discharge outlet, $b^3$, will be formed square in cross-section, as shown in Fig. 5, so as to conform with the shape of the water discharged by the piston. This discharge opening, $b^3$, is formed with a finished face and secured thereto is a discharge nozzle as shown in Fig. 4 which is also formed square in cross-section at the point of connection as indicated at $e^1$ and is tapered or reduced towards its discharge or outer end as indicated at $e^2$ and formed screw-threaded as shown at $e^3$ to receive the screw-threaded end of a suitable discharge pipe. By this construction of the nozzle it can be adapted to fit any size discharge pipe by simply cutting the nozzle off at different points to obtain any sized opening desired and then screw-threading the end to conform to the size of the discharge pipe to which it is to be connected.

Having thus described my invention, I claim;

1. In a centrifugal pump, a cylinder, a rotary piston therein, said piston consisting of an outer ring and an inner core, the outer ring being formed in a plane substantially at right angles to the axis of the cylinder, inclined vanes or wings extending laterally from said ring, and curved screw-shaped blades of less number than said vanes forming said inner core and joined to said wing so as to connect with and form a continuation of certain of said vanes, as and for the purpose specified.

2. In a centrifugal pump, an outer casing having an axial inlet and a peripheral discharge opening, a rotary piston within said casing said piston consisting essentially of two parts, to wit: an outer peripheral ring in a plane at right angles to the axis of rotation of said piston, and a central hub formed of screw-shaped blades extending laterally and tapering to and terminating at the axial inlet, said ring being also provided with a series of laterally extending wings or vanes on opposite sides thereof, the number of said vanes being greater than said screw-shaped blades and placed at substantially equal distances between said blades, as and for the purpose specified.

3. In a centrifugal pump, an outer casing having an axial inlet and a peripheral discharge, a rotary piston therein, said piston consisting of inner curved radial blades tapering to and terminating at the axial inlet and outer medial ring to which said blades are connected, and a series of inclined blades extending laterally from each side of said ring to which some of said vanes are connected to form a continuation of said blades, as and for the purpose specified.

4. In a centrifugal pump, a cylinder, a rotary piston therein, the inner zone of said piston consisting of a series of radial screw-shaped blades and the outer zone consisting of a medial ring connecting the outer ends of said blades which are extended in an inclined direction on each side of said ring to form vanes thereon, and a series of intermediate inclined vanes corresponding to the projecting portions of said blades also located at intervals on said ring, the inclination of said vanes corresponding to the projecting portions of said blades, as and for the purpose specified.

5. In a centrifugal pump, a cylinder and a cylinder head, an arch-shaped frame and base formed integral with said head, a rotating piston and an axial shaft secured thereto, bearings in said arch-shaped frame for said shaft, and a thrust collar intermediate said bearings, as and for the purpose specified.

6. In a centrifugal pump, a cylinder, a rotating piston therein having screw-shaped radial blades, and an outer peripheral ring connecting said blades at or near the middle thereof, laterally projecting vanes on said ring intermediate said blades, a cylinder head for said cylinder formed integral with an arch-shaped frame having a base, a shaft forming the axis for said cylinder extending through said frame, and an outer bearing supported by said arch and thrust collar on said shaft within said bearing, said thrust collar having longitudinal and transverse passage-ways in proximity to said shaft and to its bearing face, as and for the purpose specified.

7. In a centrifugal pump, a cylinder, a rotary piston therein, the inner zone of said piston consisting of radial curved blades tapered to and terminating at the inlet opening, the outer zone of said cylinder consisting of a medial ring having laterally extending vanes intermediate said curved blades, a peripheral discharge opening having a removable nozzle, and a removable cut-off located between said nozzle and said casing to form a variable discharge opening, as set forth.

8. In a centrifugal pump, a cylinder, a rotary piston therein, a discharge opening for said piston, a removable nozzle for said opening and a knife-edged cut-off located in a plane substantially tangential to the periphery of said cylinder and between said cylinder and nozzle, substantially as specified.

9. In a centrifugal pump, a cylinder, a rotary piston therein, a discharge opening, and a removable knife-edged cutter extending partly across said opening, substantially as and for the purpose specified.

10. In a centrifugal pump a cylinder, a rotary piston, and a discharge opening, a removable housing about said opening, and a knife-edged cutter removably secured to said cylinder beneath said housing and extending partly across said opening, substantially as and for the purpose specified.

In testimony whereof, I have hereunto set my hand this 30th day of September, 1907.

JOSEPH PIRKL.

Witnesses:
D. H. MORRIS,
R. W. SULLIVAN.